3,658,815
10-(AMINOALKYL) DIBENZO[a,d]CYCLOHEPTA-DIENES AND THE SALTS THEREOF

Jean Clement Louis Fouche, Bourg-la-Reine, France, assignor to Rhone-Poulenc S.A., Paris, France
No Drawing. Filed June 14, 1965, Ser. No. 463,936
Claims priority, application France, June 18, 1964, 978,823; Apr. 16, 1965, 13,635
Int. Cl. C07c 87/28; C07d 57/36
U.S. Cl. 260—253                                                   2 Claims

ABSTRACT OF THE DISCLOSURE 10-aminoalkyl-dibenzo [a,d] cycloheptadienes derivatives and their salts thereof which have pharmacodynauric properties such as antidepressant, neuroleptic and tranquillising properties.

---

This invention relates to dibenzocycloheptadiene derivatives and their preparation.

The invention provides, as new compounds, the dibenzo[a,d]cycloheptadiene derivatives of the formula:

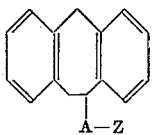

and their acid addition salts and quaternary ammonium derivatives in which A is a straight or branched, divalent, saturated aliphatic hydrocarbon chain of 2 to 5 carbon atoms such that at least 2 carbon atoms separate the radical Z from the dibenzocycloheptadiene ring, and Z is amino, monoalkylamino, dialkylamino in which the alkyl radicals contain 1 to 5 carbon atoms each, or a mononuclear, nitrogen-containing heterocycle connected to the chain A by the nitrogen atom, and optionally containing an oxygen, sulphur, or second nitrogen atom in the ring and optionally substituted by one or more alkyl radicals containing 1 to 5 carbon atoms each, such as 1-pyrrolidinyl, piperidino, morpholino, 1-piperazinyl, or 4-alkyl-1-piperazinyl.

Especially valuable compounds of Formula I are those in which A is —(CH$_2$)$_2$ or —(CH$_2$)$_3$— and Z is monoalkylamino or dialkylamino in which the alkyl radicals contain 1 to 2 carbon atoms each.

According to a feature of the invention, the compounds of Formula I are prepared by hydrogenating a dibenzo [a,d]cycloheptatriene of the formula:

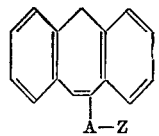

in which A and Z are as hereinbefore defined.

This hydrogenation is preferably carried out in the presence of a Raney nickel catalyst, under pressure and at an elevated temperature. It is particularly advantageous to work under a pressure of about 50 bars and at a temperature between 50° and 100° C.

The starting materials of Formula II can be obtained as described in my application Ser. No. 459,921 filed May 17,1965 and now U.S. Patent No. 3,480,624, to which reference is made for a detailed description.

According to a further feature of the invention, the compounds of Formula I are prepared by reacting a dibenzo[a,d]cycloheptadiene of the formula:

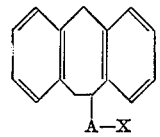

with an amine of formula H–Z, in which —X represents a reactive ester residue such as a halogen atom or a sulphuric or sulphonic ester residue, for example a methane-sulphonyloxy or toluene-p-sulphonyloxy radical, and A and Z are as hereinbefore defined.

This reaction is preferably carried out in an inert organic solvent, such as an aromatic hydrocarbon (e.g. benzene or xylene) or an alcohol (e.g. ethanol), in the presence of an acid-binding agent. It is particularly advantageous to work at the boiling temperature of the solvent, in the presence of an excess of amine of formula H–Z, which serves as acid-binding agent.

The compounds of Formula I may optionally be purified by physical methods (such as distillation, crystallisation, or chromatography) or chemical methods, such as formation of salts, crystallisation of the latter, followed by decomposition of them in an alkaline medium. In these operations, the nature of the anion of the salt is immaterial, the only necessary conditions being that the salt is well-defined and can easily be crystallised.

The compounds of Formula I and their acid addition salts and quaternary ammonium derivatives, have interesting pharmacodynamic properties. They are active on the central nervous system, having antidepressant, neuroleptic and tranquillising properties. They also have a good anti-serotonin and spasmolytic activity. Of the new compounds, 10 - (3-dimethylaminopropyl)dibenzo[a,d]cycloheptadiene is of particular interest.

For therapeutic purposes, the new compounds may be used either as the bases, or as pharmaceutically acceptable acid addition salts or quaternary ammonium derivatives, i.e. salts and derivatives containing anions which are non-toxic in the doses used.

As examples of parmaceutically acceptable addition salts, there may be mentioned the salts of mineral acids (such as the hydrochlorides, sulphates, nitrates, and phosphates) and salts of organic acids (such as the acetates, propionates, succinates, benzoates, oxalates, fumarates, maleates, theophylline-acetates, salicylates, phenolphthalinates, and methylene-bis-β-hydroxynaphthoates) or substitution derivatives of these acids.

As examples of pharmaceutically acceptable quaternary ammonium derivatives, there may be mentioned derivatives of mineral or organic acids, such as the methochlorides, methobromides, methiodides, ethochlorides, ethobromides, ethiodides, allylchlorides, allylbromides, allyliodides, benzylchlorides, benzylbromides, benzyliodides, the methyl and ethyl sulphates, the benzenesulphonates, and the substitution derivatives of these compounds.

The addition salts can be obtained by the action of the bases of Formula I on acids in appropriate solvents. Suitable organic solvents include, for example, alcohols, ethers, ketones or chlorinated solvents. The salt which forms precipitates after optional concentration of its solution and is separated by filtration or decantation.

The quaternary ammonium salts can be obtained by the action of the bases of Formula I on suitable reactive esters, optionally in an organic solvent, at normal temperature or, more rapidly, with gentle heating.

The following examples illustrate the invention.

EXAMPLE 1

3.85 g. of 10-(3-dimethylaminopropyl)dibenzo[a,d] cycloheptatriene (prepared as described in Example 1 of my application Ser. No. 459,921 and now U.S. Pat. No. 3,480,624), dissolved in 50 cc. of anhydrous ethanol, are hydrogenated for 7 hours in an autoclave in the presence of 4 g. of Raney nickel, under an initial pressure of 50 bars and at a temperature of 70° C. After cooling and reduction of pressure to normal, the reaction mixture is filtered and the nickel is washed four times with a total of 100 cc. of ethanol. The combined filtrates are evaporated. The oily residue obtained is dissolved in 150 cc. of diethyl ether and extracted twice with a total of 150 cc. of 2 N aqueous methanesulphonic acid. The combined aqueous phases are washed with 80 cc. of diethyl ether and then made alkaline with 40 cc. of 10 N sodium hydroxide solution. The oil which separates out is extracted twice with a total of 200 cc. of diethyl ether. The combined organic phases are washed twice with a total of 300 cc. of distilled water, dried over anhydrous potassium carbonate, and evaporated. The last traces of solvents are eliminated by heating to 60–70° C. under reduced pressure (20 mm. Hg) for 30 minutes. The oily residue obtained (3.45 g.), dissolved in 10 cc. of ethyl acetate, is poured into a boiling solution of 1.50 g. of maleic acid in 17 cc. of ethyl acetate.

After cooling for 4 hours to 25° C. the crystals which have appeared are separated, washed with 12 cc. of ethyl acetate, and finally dried under reduced pressure. 3.95 g. of 10 - (3 - dimethylaminopropyl)dibenzo[a,d]cycloheptadiene maleate, M.P. 124–126° C., are obtained.

EXAMPLE 2

A solution of 6.8 g. of 10-(2 - dimethylaminoethyl) dibenzo[a,d]cycloheptatriene (prepared as described in Example 12 of my application Ser. No. 459,921 and now U.S. Pat. No. 3,480,624.) in 70 cc. of anhydrous ethanol is hydrogenated for 7 hours in an autoclave in the presence of 7 g. of Raney nickel, under an initial pressure of 50 bars and at a temperature of 70° C. After cooling and reduction of pressure to normal, the reaction mixture is filtered, and the nickel is washed 3 times with a total of 240 cc. of ethanol. The combined filtrates are evaporated. The oily residue obtained is dissolved in 200 cc. of diethyl ether and extracted twice with a total of 200 cc. of 2 N aqueous methanesulphonic acid. The combined aqueous phases are washed with 150 cc. of diethyl ether and then made alkaline with 60 cc. of 10 N sodium hydroxide solution. The oil which separates out is extracted twice with a total of 400 cc. of diethyl ether. The combined organic phases are washed twice with a total of 400 cc. of distilled water, dried over anhydrous potassium carbonate, and evaporated. The oily residue obtained (6.0 g.), dissolved in 14 cc. of boiling ethyl acetate, is added to a boiling solution of 2.9 g. of maleic acid in 28 cc. of ethyl acetate. After cooling for 17 hours to 3° C., the crystals which have appeared are separated, washed with 10 cc. of ethyl acetate, and dried under reduced pressure (20 mm. Hg.). 7.7 g. of 10-(2-dimethylaminoethyl)dibenzo[a,d]cycloheptadiene maleate, M.P. 131–133° C., are obtained.

EXAMPLE 3

A solution of 12.0 g. of 10-(3-methylaminopropyl) dibenzo[a,d]cycloheptatriene (prepared as described in Example 5 of my application Ser. No. 459,921 and now U.S. Pat. No. 3,480,624) in 155 cc. of anhydrous ethanol is hydrogenated for 7 hours in an autoclave in the presence of 12 g. of Raney nickel under an initial pressure of 50 bars and at a temperature of 70° C. After cooling and reduction of pressure to normal, the reaction mixture is filtered, and the nickel is washed 3 times with a total of 300 cc. of ethanol. The combined filtrates are evaporated. The oily residue obtained is dissolved in 400 cc. of diethyl ether and extracted twice with a total of 400 cc. of 2 N aqueous methanesulphonic acid. The combined aqueous phases are washed with 300 cc. of diethyl ether and then made alkaline with 90 cc. of 10 N sodium hydroxide solution. The oil which separates out is extracted twice with a total of 800 cc. of diethyl ether. The combined organic phases are washed twice with a total of 800 cc. of distilled water, dried over anhydrous potassium carbonate, and evaporated. The oily residue obtained (10.7 g.), dissolved in 35 cc. of anhydrous acetone, is added to a solution of 4.0 g. of anhydrous oxalic acid in 90 cc. of anhydrous acetone. After cooling for one hour to 3° C., the crystals which have appeared are separated, washed 3 times with a total of 120 cc. of anhydrous acetone, and dried under reduced pressure (20 mm. Hg). 12.2 g. of 10 - (3 - methylaminopropyl)dibenzo[a,d] cycloheptadiene oxalate, M.P. 160° C., are obtained.

The invention includes within its scope pharmaceutical compositions comprising one or more of the compounds of Formula I or acid addition salts or quaternary ammonium derivatives thereof, in association with a significant amount of a pharmaceutical carrier (including coating). Such compositions include especially those which are suitable for oral, rectal or parenteral administration.

Solid compositions for oral administration include tablets, pills, powders and granules. In such solid compositions, the active compound is mixed with one or more inert diluents, such as sucrose, lactose or starch. These compositions may also comprise, as is normal practice, substances other than diluents, e.g. lubricants, such as magnesium stearate.

Liquid compositions for oral administration include pharmaceutically acceptable emulsions, solutions, suspensions, syrups, and elixirs, containing inert diluents, such as water or liquid paraffin. These compositions may also comprise substances other than diluents, for example wetting agents, sweetening agents, flavourings, perfumes, and preservatives.

The compositions of the invention for parenteral administration may be aqueous or non-aqueous sterile solutions, suspensions, or emulsions. As solvent or vehicle, it is possible to use propylene glycol, polyethylene glycol, vegetable oils, especially olive oil, and injectable organic esters, for example ethyl oleate. These compositions may also contain adjuvants, particularly wetting, emulsifying and dispersing agents. The sterilisation can be carried out in various ways, for example, with the aid of a bacteriological filter, by incorporating sterilising agents into the composition, by irradiation, or by heating. The compostions may also be prepared in the form of sterile solid compositions which can be dissolved, at the moment of use, in sterile water or any other sterile injectable medium.

Compositions for rectal administration are suppositories which contain, in addition to the active compound, excipients such as cocoa butter or suppository wax.

The dose to be used depends on the therapeutic effect desired, the method of administration, and the period of treatment. Perorally, generally between 10 mg. and 100 mg. of active product per day for an adult is administered.

The following examples illustrate such compositions.

EXAMPLE 4

By the usual technique, tablets are prepared having the following composition:

| | Mg. |
|---|---|
| 10 - (3 - dimethylaminopropyl)dibenzo[a,d]cycloheptadiene maleate | 7 |
| Starch | 108 |
| Colloidal silica | 32 |
| Megnesium stearate | 3 |

EXAMPLE 5

By the usual technique, tablets are prepared having the following composition:

| | Mg. |
|---|---|
| 10 - (3 - dimethylaminopropyl)dibenzo[a,d]cycloheptadiene maleate | 35.4 |
| Starch | 81.6 |
| Colloidal silica | 30 |
| Magnesium stearate | 3 |

I claim:
1. A dibenzo[a,d]cycloheptadiene derivative of the formula:

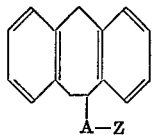

and its acid addition salts and quaternary ammonium derivatives, in which A is a member selected from the group consisting of —$(CH_2)_2$— and —$(CH_2)_3$— and Z is a member selected from the group consisting of monoalkylamino and dialkylamino in which the alkyl radicals contain 1 to 2 carbon atoms each.

2. 10 - (3 - dimethylaminopropyl)dibenzo[a,d]cycloheptadiene and its acid addition salts and quaternary ammonium derivatives.

References Cited

Villani et al.: Jour. of Med. and Pharm. Chem., vol. 5, pp. 373–83 (1962).

ROBERT V. HINES, Primary Examiner

U.S. Cl. X.R.

260—247, 268 TR, 293 R, 326.81, 343.4, 501.1, 501.15, 567.6 M, 570.8 TC; 424—248, 250, 253, 267, 274, 285, 329, 330